Dec. 18, 1956  S. R. HENNIES ET AL  2,774,962
ELECTRICAL KEYER
Filed Dec. 7, 1953.  2 Sheets-Sheet 1

INVENTORS:
Stuart R. Hennies
Donald D. Keep
By Herbert E. Metcalf
Their Patent Attorney

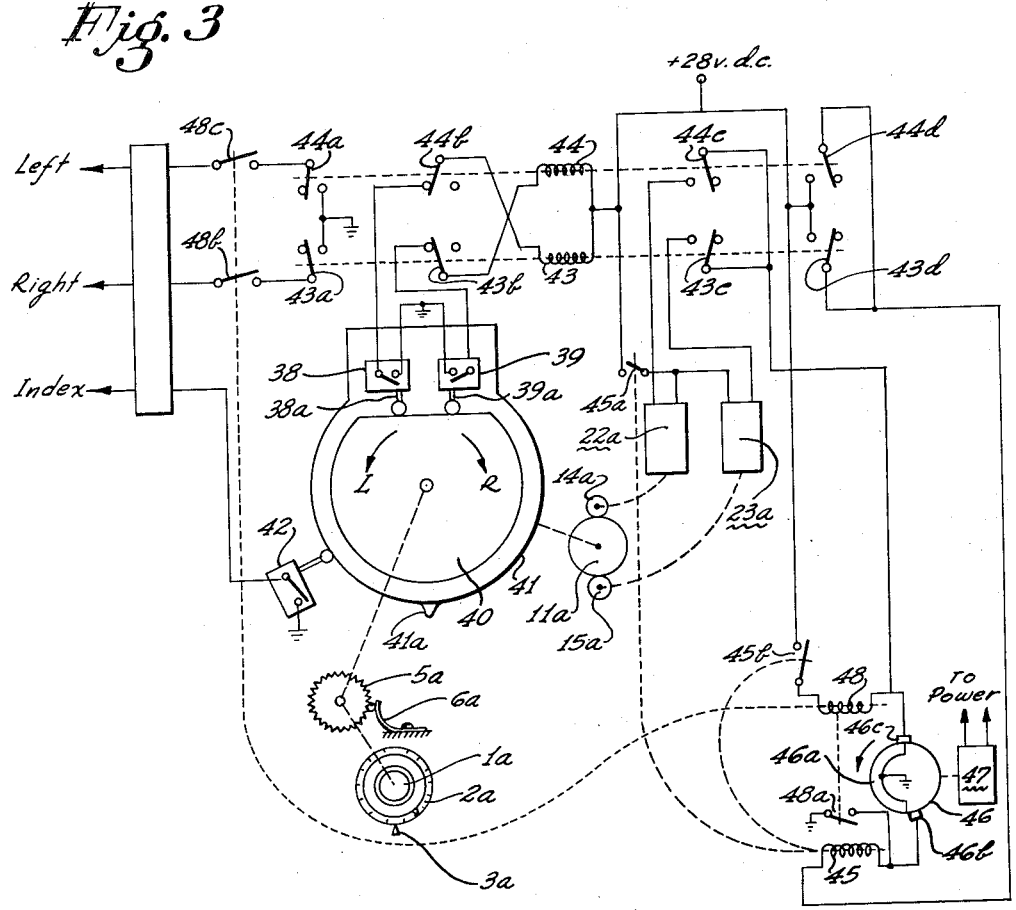

United States Patent Office 2,774,962
Patented Dec. 18, 1956

2,774,962

ELECTRICAL KEYER

Stuart Randall Hennies, Palo Alto, and Donald D. Keep, Inglewood, Calif., assignors to Northrop Aircraft, Inc., Hawthorne, Calif., a corporation of California Application December 7, 1953, Serial No. 396,615

11 Claims. (Cl. 340—359)

This invention relates generally to keyer mechanisms and more particularly to electrical keyer means useable in the remote control of aircraft.

The remote control of aircraft can be effected by use of a radio link connecting a ground control station to the controlled craft. The ground station comprises, in general, a transmitter and a keying unit, and the controlled craft carries on board a receiver, the output of which is employed to control the autopilot. The keying unit is usually a toggle switch that can be manually operated on and off a number of times, this action keying the transmitter so that it produces a corresponding pulse output that can be received by the receiver for proper control of the aircraft.

Usually there are several transmitter (and receiver) channels and a toggle switch would be required for each circuit for control thereof. This results in a rather complex and difficult to operate system.

It is an object of the present invention to provide keyer means wherein periodic switching is automatically performed by the simple rotation of a knob.

Another object of the invention is to provide keyer means in which the number of pulses created by the automatic switching process is proportional to the angular displacement of the knob.

Another object of the invention is to provide keyer means in which the periodic switching rate is constant irrespective of the speed of knob rotation.

A further object of this invention is to provide keyer means wherein automatic periodic switching is created in separate channels respectively for different directions of knob rotation and means are provided to produce a reference signal at an index position.

The foregoing and other objects are preferably accomplished, in short, by providing a knob having a calibrated dial attached thereon, the knob being utilized to rotate switching means in which a condition of electrical unbalance will occur, this condition resulting in the actuation of control relays that permit the periodic energization of rotary solenoids which act to eliminate the unbalanced condition in finite steps by driving follow-up means which produce a null only when correctly oriented (reset) with the former unbalanced switching means. Keying (switching) means are actuated with the periodic energization of the rotary solenoids to provide keying for external equipment. A constant speed motor driving a commutator type breaker mechanism causes the periodic actuation of the rotary solenoids and the keying means for external equipment by controlling the ground connection to the control relays.

The invention will be more fully understood by reference to the accompanying drawings, shown by way of illustration and not limitation, in which:

Figure 3 is a schematic diagram of an alternate electrical keyer which differs in some mechanical aspects from that shown in Figure 1.

Figure 1:
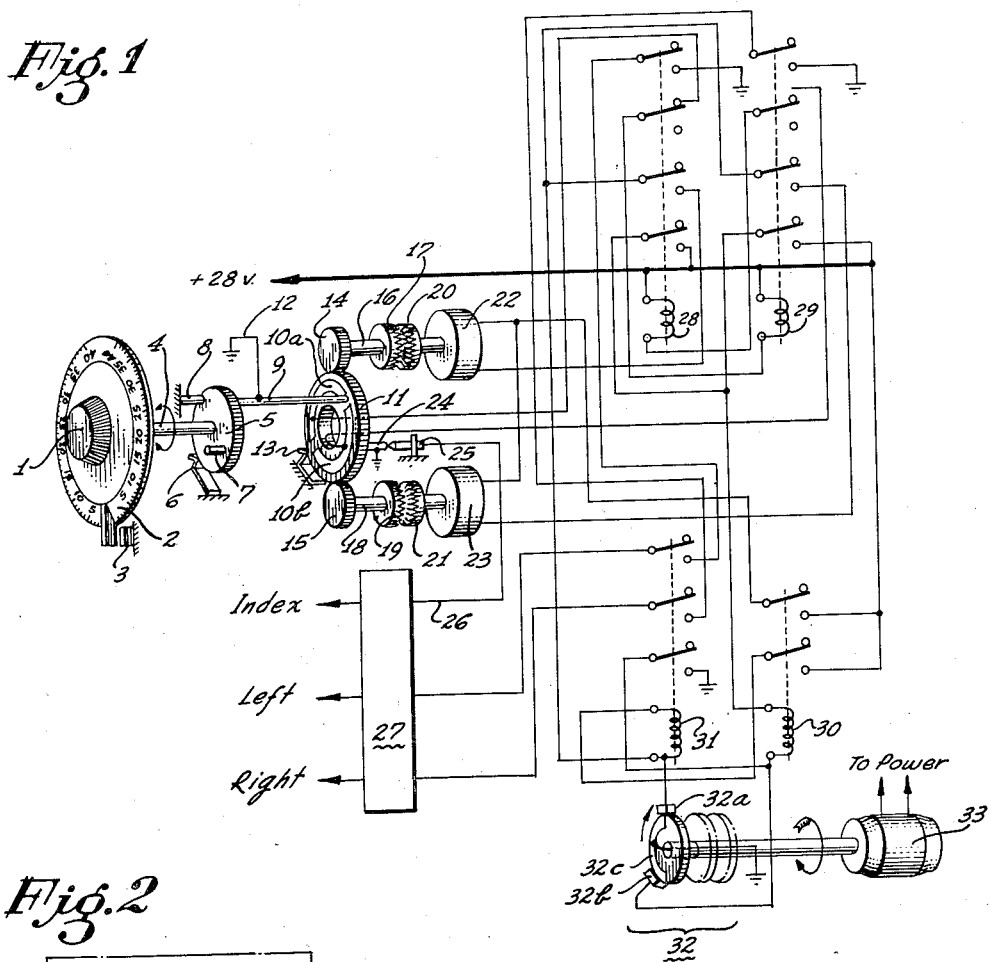
Figure 1 is a schematic perspective drawing and wiring diagram of a preferred embodiment of the invention.

Referring to Figure 1, there is shown a preferred embodiment of the present invention in a semi-perspective schematic. In this figure, a flanged knob 1 has a dial 2 engraved on the beveled surface of the knob flange. This dial 2 indicates against a fixed pointer 3. The knob 1 is suitably secured to the end of a gear shaft 4. A gear 5 attached to shaft 4 has a gear teeth pitch corresponding to a unit division on dial 2. The gear teeth work against a ratchet-detent 6 such that the knob 1 can be rotated in discrete steps and be held in a set position. A pin 7 is embedded in gear 5 and cooperates with a stop pin 8 to restrain rotation of knob 1 within the calibrated limits of dial 2 as shown. A wiper 9 insulated from gear 5 is attached to gear 5 and is positioned to ride on two half slip rings 10a and 10b which are embedded (and insulated) in gear 11. The wiper 9 is connected to a lead 12 which is grounded. Gear 11 is the same size as gear 5 and has the same number of teeth and pitch. A ratchet-detent 13 is also braced against the teeth of gear 11. Two smaller gears 14 and 15 (same pitch as gear 11) are meshed with gear 11, gear 14 being mounted on the same shaft 16 as a ratchet wheel 17 and gear 15 is mounted on the same shaft 18 as is another ratchet wheel 19. Ratchet wheels 17 and 19 can be engaged respectively with driving ratchet wheels 20 and 21 of two rotary solenoids 22 and 23. The rotary solenoids can be actuated by electrical pulses, each pulse causing a driving ratchet wheel to advance axially, engaging with a driven ratchet wheel and at the same time rotating through a certain angle. Thus, the gear 11 can be rotated in one direction or the other by rotary solenoids 22 and 23 which drive gear 11 in opposite directions in steps of the gear pitch corresponding to a unit division on dial 2.

A pin 24 is attached to and insulated from gear 11 such that the pin 24 protrudes outwardly from the face of gear 11. This pin 24 is connected to ground and makes contact with a fixed pin 25 (insulated from ground) whenever the gear 11 assumes a reference position designated as index. In index position, the zero marking on dial 2 is indexed against the pointer 3 and wiper 9 is positioned between two ends of the half rings 10a and 10b as illustrated. A lead 26 is connected from pin 25 to a terminal strip 27 which connects with external equipment. The half slip rings 10a and 10b are connected to terminals in respective four pole selecting relays 28 and 29. These two selecting relays control the correct application of voltage (pulses) to the proper rotary solenoid according to the displacement of wiper 9. They also control the ground connection for leads connecting with external equipment. A double pole pulsing relay 30 restricts the application of voltage to the rotary solenoids to the form of pulses and a triple pole switching relay 31 governs the periodic grounding of leads connecting with external equipment. These relays are interconnected as shown in Figure 1.

The pulsing relay 30 and switching relay 31 are periodically energized according to the rotation of a commutator type breaker mechanism 32 driven by a motor 33 rotating at a constant speed, for example, 600 R. P. M. to produce an output of 10 pulses per second from relays 30 and 31. Two brushes 32a and 32b ride on the periphery of the commutator disk and make contact with a conducting half ring 32c which is connected to ground. The brush 32b is positioned to make contact first and brush 32a second with half ring 32c as shown in Figure 1. The same motor 33 can be used to drive additional breaker mechanisms on the same drive shaft for other keyers. This is indicated by the commutator disks shown on the drive shaft of motor 33 in broken lines.

Figure 2:
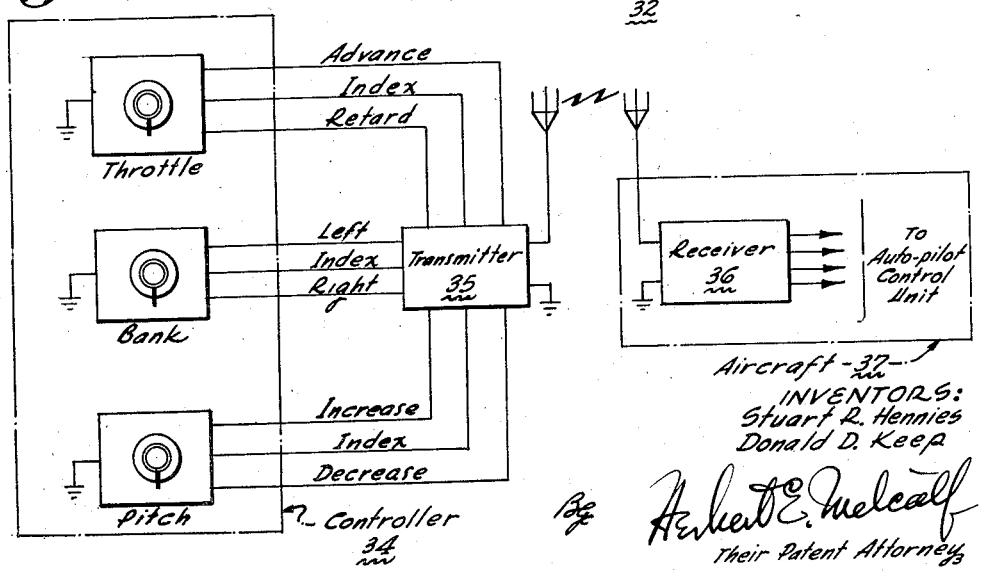
Figure 2 is a block diagram showing three keyers connected to key a transmitter, the transmitter being used for remote control of aircraft, for example.

In Figure 2, three keyers have been assembled together to form an aircraft controller unit 34 for remote control of aircraft. These keyers each control three separate channels of a transmitter 35. Each channel puts out a different "tone," these tones being provided in pulses, the number of which correspond to the increments manually keyed by operating the respective control knobs of controller 34. The transmitter 35 thus radiates a series of pulses which are received by a receiver 36 carried on board an aircraft 37. The receiver 36 filters the different tones into corresponding channels which are connected to an autopilot control unit for proper control of aircraft throttle setting, bank angle and pitch, respectively. It is to be noted, however, that the indexing transmitter channels each radiate a constant tone output since the indexing switch consisting of pin 24 contacting pin 25 (Figure 1) is not periodically operated as is the relay 31 which controls left and right tones in a pulsed output, for example.

Referring now to Figure 3, there is shown in a more schematically arranged drawing, an electrical keyer embodiment differing only in some mechanical aspects. The former wiper 9 and two half slip rings 10a and 10b have been replaced by two microswitches 38 and 39 and a flat topped (schematically exaggerated) cam 40 in Figure 3. Microswitches 38 and 39 are mounted on a follow-up cam 41 as shown. Cam 41 is raised at one spot 41a to actuate an index microswitch 42 which replaces the switch consisting of pins 24 and 25 (Figure 1). The knob 1a is identical to knob 1 of Figure 1 and has a dial 2a which indicates against a fixed pointer 3a. Knob 1a is mounted on the same shaft as are gear 5a and cam 40, the gear 5a working against a ratchet-detent 6a. Thus, rotation of knob 1a turns both gears 5a and cam 40. Microswitch 38 or 39 is actuated depending upon the direction of knob rotation. These microswitches 38 and 39 have respective pivot arms 38a and 39a which actuate a switch only when tilted in one direction and not in the other. Cam 41 is mounted on the same shaft as gear 11a which corresponds to gear 11 (Figure 1). Gear 11a meshes with gear 14a and 15a which gears can be mechanically engaged and driven by respective rotary solenoids 22a and 23a. The remainder of the circuit is identical to that of Figure 1 except the wiring is arranged a little differently for clarity of illustration.

Because of greater schematic clarity, the operation is described with reference to Figure 3 although the description is also directly applicable to the embodiment shown in Figure 1. Assume, for example, the knob 1a is turned to the right such that dial 2a now reads zero (indexed). The cam 40 is also rotated the same angular amount and in doing so, actuates switch 38 grounding the coil of relay 43. Since the coil of relay 43 (and coil of relay 44) is connected to +28 volts, this relay 43 is actuated. Relay contacts 43a are connected to ground by this action, contacts 43b are opened, and contacts 43c and 43d are closed. Contacts 43b when opened, break the coil circuit of relay 44 to insure non-operation of this relay. Closing of the contacts 43d energizes the coil of relay 45 when the grounded, conducting half ring 46a makes contact with brush 46b. The commutator type breaker mechanism 46 is driven by a constant speed motor 47.

A second brush 46c is positioned on the periphery of the commutator disk to be not diagonally opposite the first brush 46b. The brush 46b is separated from brush 46c at a little less than 180 degrees in the direction of disk rotation such that the brush 46b makes contact with the half ring 46a first and brush 46c makes contact with half ring 46a second. When brush 46b contacts half ring 46a, relay contacts 45a and 45b are closed. Brush 46c makes contact with half ring 46a a little later (brush 46b is still making contact with half ring 46a) and the coil of relay 48 becomes energized. Since relay contacts 45a and 43c are already closed, rotary solenoid 23a is also energized. Relay contacts 48a, 48b and 48c are closed when brush 46c becomes grounded. Relay contact 48a grounds the coil of relay 45 such that when the half ring 46a has rotated off brush 46b but still contacting brush 46c, the contacts 45a and 45b are still held closed until the half ring 46a leaves brush 46c also. Thus, the rotary solenoid 23a is energized by pulses which are approximately one-half a cycle (breaker) wide. Each pulse advances the rotary solenoid 23a one step, the gear 15a being rotated 25 degrees for each step, for example. Since gear 11a meshes with gear 15a, this gear 11a is also rotated, for example, 4.5 degrees for each step and rotates cam 41 to the right in these increments until the microswitches 38 and 39 are reset, i. e., brought back on the flat top of cam 40 whereby switch 38 opens and de-energizes relay 43, stopping the follow-up system. It is to be noted that relay 45 (or relay 30 in Figure 1) was included in the circuit as well as brush 46b (or brush 32b) to ensure that a full length pulse was always sent to the transmitter and rotary solenoids. In other words, relay 45 must be actuated prior to relay 43 before anything can happen, and this accounts for the fact that knob 1a (or knob 1) can be rotated at any time without the position of the segment 46a (or 32c) relative to brush 46c (or brush 32a, respectively) determining how long the pulse will be.

Relay contacts 48b and 48c are closed the same time and duration as when a pulse is applied to a rotary solenoid. Since relay contacts 43a are connected to ground, the periodic closing of relay contacts 48b keys the "right" channel of a transmitter in a series of pulses (see Figure 2). This produces a corresponding series of tone pulses to be radiated from transmitter 35 which are received and filtered into the correct control channel by the receiver 36. This signal is employed to control the autopilot of the aircraft 37, causing the craft to bank right as commanded.

In the operation example described, the dial 2a was rotated into index position and the final null position of cam 41 is such as to actuate index switch 42. Thus the aircraft 37 is gradually returned to a straight (unbanked) flight and the controls are retained in index setting to maintain unbanked flight.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An electrical keyer, comprising: a knob having a calibrated dial thereon; fixed pointer, said dial indicating against said pointer; first switching means actuated by rotation of said knob in one direction; second switching means actuated by rotation of said knob in the other direction; first control means responsive to the actuation of said first switching means; second control means responsive to the actuation of said second switching means; first keying means; second keying means; and driving means for actuation of said keying means and resetting said first and second switching means, said driving means for actuating of said keying means and actuate said first keying means and reset said first switching means and said driving means controlled by said second control means to actuate said second keying means and reset said second switching means, whereby said first and second keying means are respectively actuated according to the rotation of said knob.

2. An electrical keyer, comprising: a knob having a calibrated dial thereon; a fixed pointer, said dial indicating against said pointer; first switching means actuated by rotation of said knob in one direction; second switching means actuated by rotation of said knob in the other direction; first control means responsive to the actuation of said first switching means; second control means responsive to the actuation of said second switching means; first keying means; second keying means; means for resetting said first switching means; means for resetting said second switching means; and means for actuating said resetting means and said keying means, said latter actuating means controlled by said first control means to actuate said first keying means and reset said first switching means and by said second control means to actuate said second keying means and reset said second switching means, whereby said first and second keying means are respectively actuated according to the rotation of said knob.

3. Apparatus in accordance with claim 2 wherein said first and second switching means include means for delaying the resetting of said respective switching means proportionately to the angular rotation of said knob, whereby said corresponding keying means is proportionately actuated longer for greater angular rotation of said knob.

4. Apparatus in accordance with claim 2 wherein means are provided for producing an indexing signal for external equipment, said indexing signal produced only when said calibrated dial is indexed against said pointer.

5. Apparatus in accordance with claim 2 wherein ratchet-detent means are provided to act against the rotation of said knob, whereby incremental step rotation of said knob is secured.

6. Apparatus in accordance with claim 2 wherein said resetting means are pulse actuated solenoids and said means for actuating said resetting means and said keying means include pulse producing means.

7. An electrical keyer, comprising; a knob having a calibrated dial thereon; a fixed pointer, said dial indicating against said pointer, first switching means actuated by rotation of said knob in one direction; second switching means actuated by rotation of said knob in the other direction; pulse responsive means for resetting said first switching means; pulse responsive means for resetting said second switching means; means for delaying the resetting of said respective switching means proportionately to the angular rotation of said knob; first control means responsive to the actuation of said first switching means; second control means responsive to the actuation of said second switching means; means providing periodic pulses; first keying means; and second keying means, said first control means actuatable to connect said means providing pulses to actuate said first keying means and reset said first switching means, said second control means actuatable to connect said means providing pulses to actuate said second keying means and reset said second switching means, whereby said first and second keying means are periodically actuated proportionately according to the rotation of said knob.

8. Apparatus in accordance with claim 7 wherein means are provided for producing an indexing signal for external equipment, said indexing signal produced only when said calibrated dial is indexed against said pointer.

9. Apparatus in accordance with claim 7 wherein said means providing periodic pulses comprises a constant speed motor; a disk driven by said motor and having a conducting half ring on the periphery thereof, said half ring connected to ground; a first and a second brush separated by less than 180 degrees riding on the periphery of said disk, said brushes connected to said first and second control means to provide a periodic ground connection for said first and second resetting means according to the rotation of said knob.

10. Apparatus in accordance with claim 7 wherein said reset delaying means comprises a flat topped cam axially mounted on the shaft of said knob, the flat on said cam providing an "off" position for said first and second switching means; a follow-up support carrying said first and second switching means, said support rotatably mounted on the same axis of rotation as said cam and rotatable by said first and second resetting means, said first and second switching means reset by rotation of said follow-up support by said reset means until said switching means reaches the flat on said cam for an "off" position, whereby resetting of said switching means is delayed porportionately according to the angular rotation of said knob.

11. Apparatus in accordance with claim 7 wherein said first and second switching means, and said reset delaying means, comprise a wiper rotated by said knob, said wiper connected to ground; a first and a second conducting half ring circularly mounted with spaced ends on a disk, said wiper riding on said half rings by rotation of said knob and said disk rotatably actuatable on the same axis as said knob by said first and second resetting means, said half rings respectively connected to said first and second control means, and rotation of said knob connecting a half ring to ground actuating the corresponding said control means to actuate the correct resetting means, thereby rotating said disk until said wiper is positioned between two ends of said circularly mounted half rings, whereby resetting of said wiper is delayed proportionately according to the angular rotation of said knob.

References Cited in the file of this patent

UNITED STATES PATENTS 2,347,481    Hooven _____ Apr. 25, 1944